Oct. 3, 1961 C. M. CARLSON 3,002,532
SOLENOID ACTUATED VALVE
Filed Aug. 31, 1959 4 Sheets-Sheet 4

INVENTOR.
CARL M. CARLSON
BY
ATTORNEYS

United States Patent Office 3,002,532
Patented Oct. 3, 1961

3,002,532
SOLENOID ACTUATED VALVE
Carl M. Carlson, 344 12th St., Cresskill, N.J.
Filed Aug. 31, 1959, Ser. No. 837,168
23 Claims. (Cl. 137—623)

This invention relates to valves for controlling the flow of materials in the liquid or gaseous state generally and more particularly to a solenoid actuated valve of the type containing a valve spool or plunger for opening and closing conduits within the valve.

Valves of many different types for controlling oil, water and liquids are known and used. A large number of these types utilize a solenoid coil to actuate the valve so that upon energization of the coil, the condition of the valve is changed from one of non-flow to flow, flow to non-flow, or to permit change of pressure to be applied in a line.

In valves of the solenoid actuated type the size of the solenoid coil and the amount of space occupied by it has been a direct function of the size of the valve since the valve size depends upon the power which the coil must develop to actuate the valve. Generally, larger valves have required larger coils, generating much power to actuate them. The large coil in addition to occupying much space consumes a large amount of electrical power. Response time of the solenoid is also important. The response time is the time that it takes the valve to change its condition from the instant of actuation of the solenoid coil.

The invention herein disclosed has as its principal object the furnishing of a new solenoid actuated valve in which the electrical power consumed upon actuation of the valve is a minimum.

Another object of this invention is to provide a solenoid actuated valve in which the solenoid coil occupies a minimum of space.

Another object of this invention is the provision of a solenoid actuated valve in which the reaction time is very short.

Still another object of this invention is the provision of a solenoid actuated valve in which the travel distance of the solenoid core is short so that the force of impact between the core and the core stop is reduced thereby increasing the life of the valve.

In order to accomplish these objects, as well as others, provision is made for a solenoid actuated valve in which the power for closing or actuating the valve is developed by the medium or fluid flowing, so that the solenoid is a control element, rather than a power element.

The description of the invention herein is made in terms of a four-way A.C. actuated valve which can be used with any fluid whether in the gaseous or the liquid state. A four-way valve is one containing five port valves having one inlet, two outlets, and two exhausts. With four-way valves, one pressure source is alternately fed to one end of a double acting cylinder then the other. The exhaust ports are synchronized to close on the end being supplied with pressure and to open on the opposite end discharging the pressure opposing piston motion. The piston is often referred to as a plunger or spool member and in this description will be referred to as a valve spool. The inventive concept disclosed herein, however, is not limited to A.C. actuated four-way valves, but can be embodied in D.C. actuated valves and in many other valve types.

In order to facilitate an explanation and description of this invention reference is had to the drawings in which.

Figure 1:
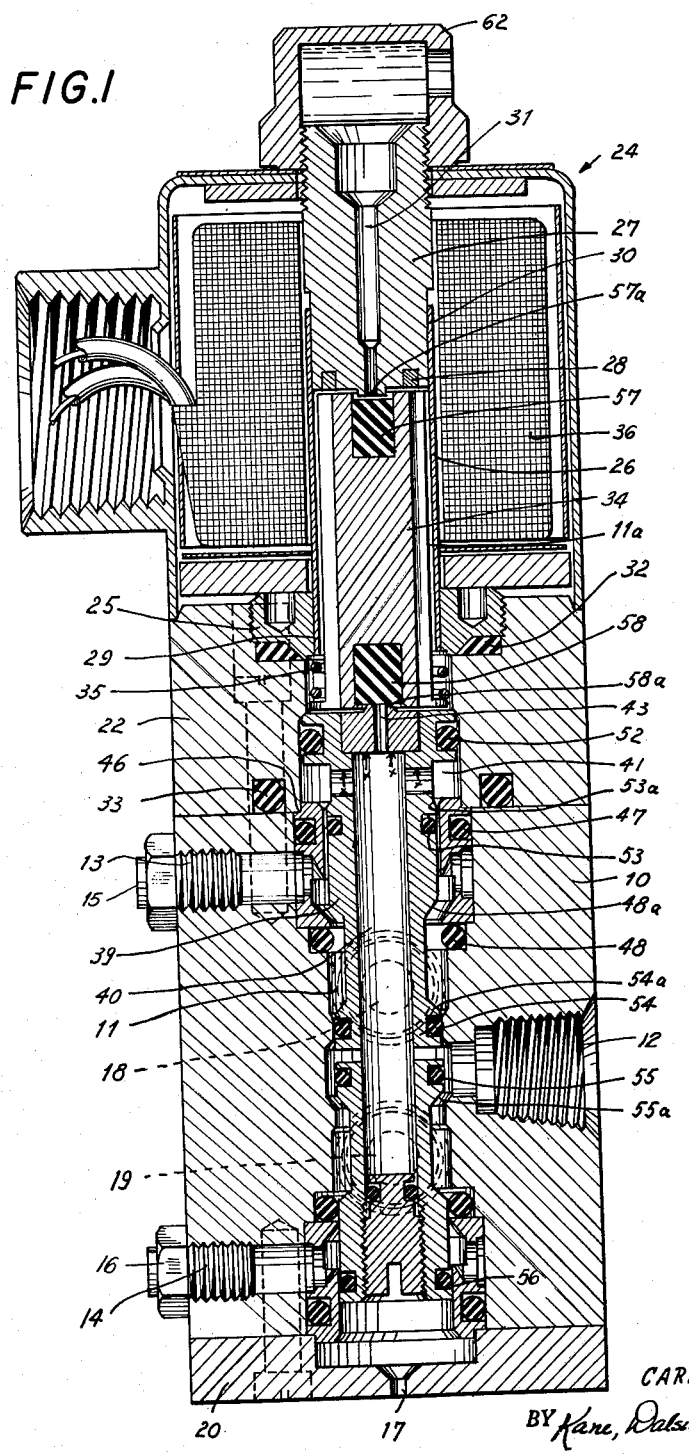
FIG. 1 is a cross sectional view of a solenoid actuated valve constructed in accordance with the teachings of this invention wherein the solenoid coil is in the de-energized condition.

In the drawings, the numeral 10 indicates the body of the valve generally which is formed with central bore 11 extending longitudinally therethrough. The body is also formed with inlet port 12 and exhaust ports 13 and 14. The inlet port 12 extends into the central longitudinal bore 11, and exhaust ports 13 and 14 which are blocked by bleeder valves 15 and 16, respectively, also communicate with the central bore 11. Vent port 17, the purpose of which will be explained below, is provided in the lowermost portion of valve body 10 so that there is external communication with central bore 11 at this point.

Cylinder outlet ports 18 and 19 communicate with the central bore 11 and extend outwardly therefrom away from the paper in each of FIGS. 1 through 4. In this embodiment ports 18 and 19, as well as ports 12, 13 and 14, extend perpendicularly from the central bore 11 so that communication therewith is at a right angle. However, communication of the ports with the central bore need not be perpendicular for the proper operation of this device. The lower end of central bore 11 is closed by end cap 20 which is fastened to the main body 10 by means of screws 21. It is end cap 20 in which vent 17 is formed. Likewise, the upper end of the valve body 10 has fastened thereto solenoid end cap 22 which is fastened to the valve body 10 by means of screws 23.

The internal surface of housing 10 surrounding central bore 11 is formed with a series of shoulders and surfaces of varying cross sectional diameters thereby changing in various portions the diameter of the central bore 11. The purpose of this will be seen presently. A solenoid housing is mounted on the top of solenoid end cap 22 and is indicated generally in the drawings by the numeral 24. Mounted within the solenoid housing is a threaded ring 25 which is welded to non-magnetic sleeve 26. The threaded ring 25 is screwed into an insert provided in solenoid end cap 22. The sleeve 26 in turn is welded to end stop 27 which mounts copper shading ring 28 in its lower face. The threaded ring, non-magnetic sleeve and stop member are each formed from stainless steel since these components are within the fluid or medium. These members may be formed from any other material which is suitable for the purpose for which the valve is used and is not specifically limited to the materials mentioned herein. The point at which ring 25 is welded to sleeve 26 is indicated in the drawings by the numeral 29, and the point at which the sleeve is welded to the end stop is indicated in the drawings by the numeral 30. These weldments should be air-tight, i.e. pressure tight weldments. Solenoid end cap 22 is provided with a central bore which forms an extension of central bore 11 in the main housing 10. Vent 31 is provided in end stop 27 which allows venting of the central longitudinal bore to atmosphere at its upper end.

Resilient seals 32 and 33 are provided to prevent leakage from the central bore between members 25 and 22 and members 22 and 10, respectively.

Figure 2:
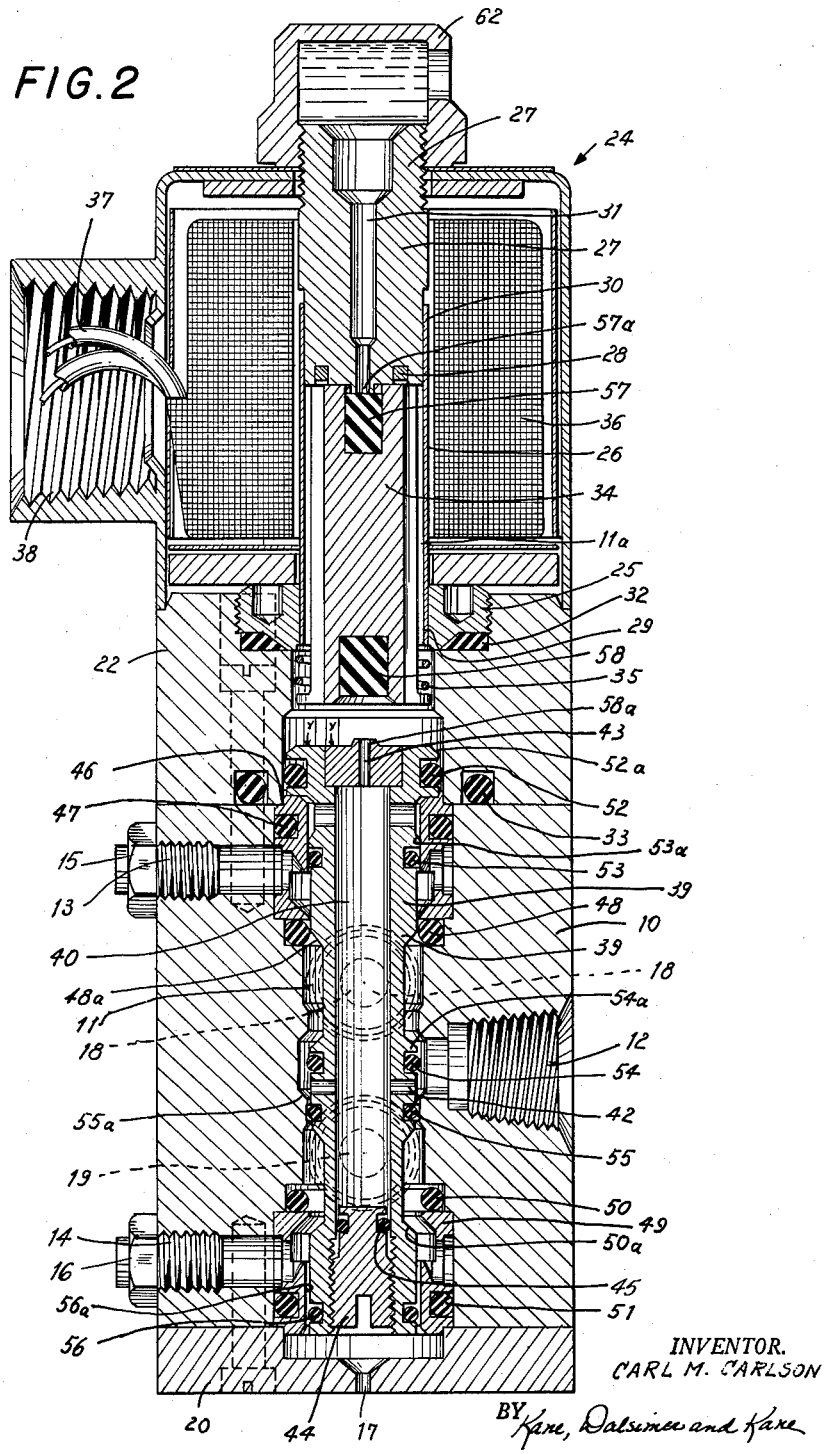
FIG. 2 is a cross sectional view of a solenoid actuated valve constructed in accordance with the teachings of this invention in which the solenoid coil is in the energized condition, and the valve is actuated.
Figure 3:
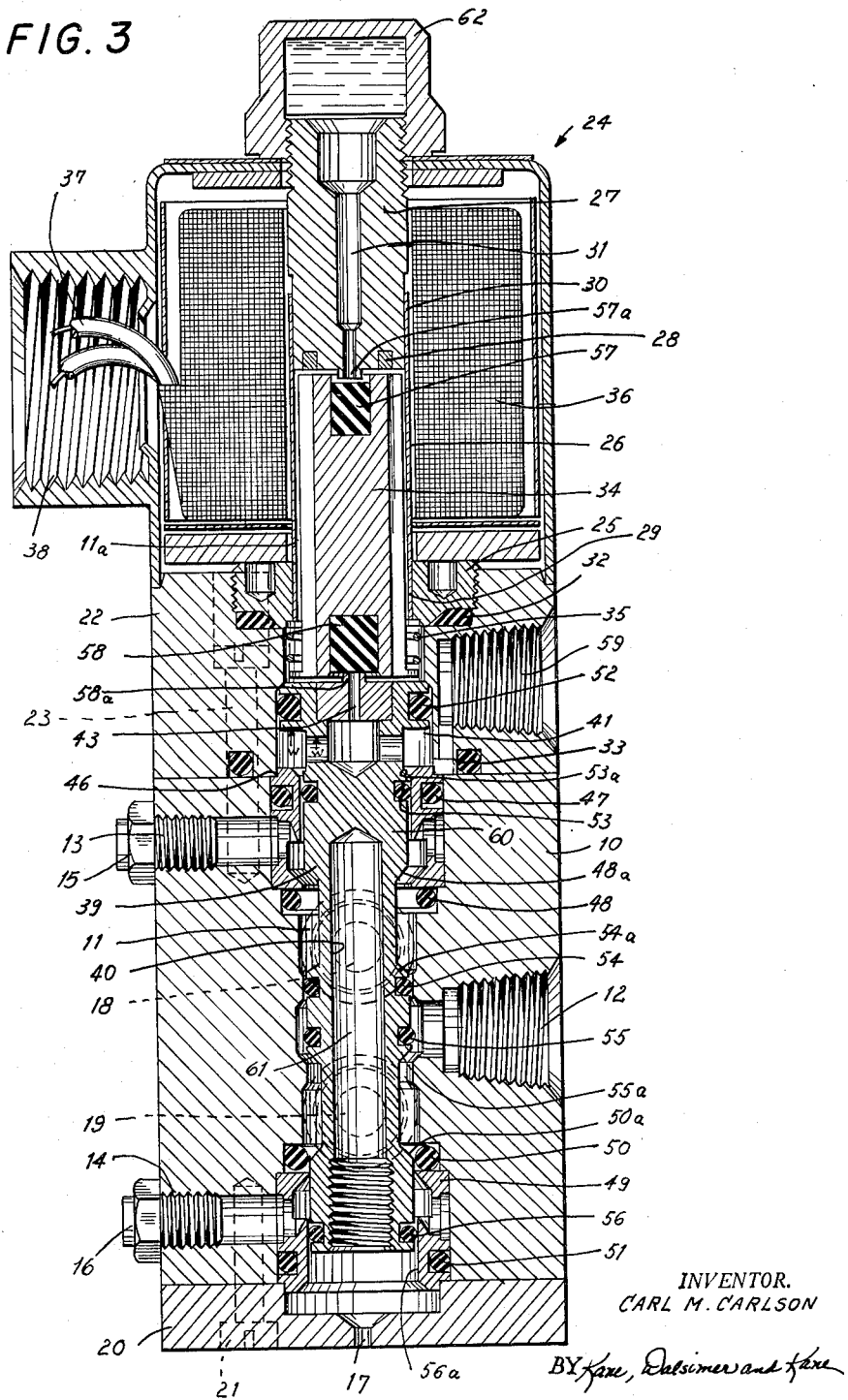
FIG. 3 is a cross sectional view of an alternate form of the invention and illustrates the solenoid coil in the de-energized condition.
Figure 4:
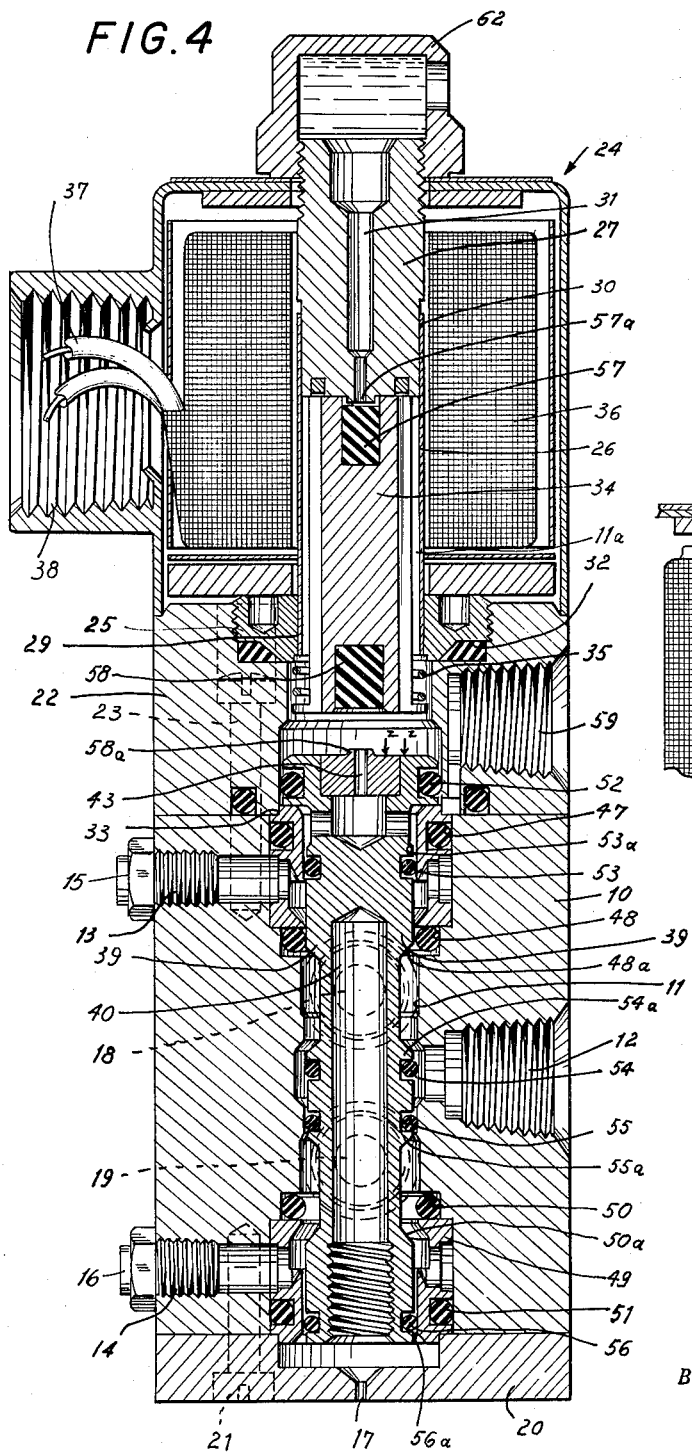
FIG. 4 is a cross sectional view of the solenoid actuated valve shown in FIG. 3, illustrating the solenoid coil in the de-energized condition, and the valve actuated.

Magnetic cylindrical plunger 34 is disposed within sleeve 26 with the lower end thereof extending out of and below sleeve 26 and spring pressed away from the sleeve and downwardly as seen in the drawings by means of spring 35. It should be noted that the lower end of the sleeve 26 extends into the central bore formed in end cap 22, as does the lower end of plunger 34. Solenoid coil 36 is provided within housing 24 and surrounds the lower portion of the stop member and the upper and major portion of sleeve 26. Electrical leads 37 are brought out from solenoid 36 through opening 38 provided in the housing 24. When coil 36 is de-energized as in FIGS. 1 and 3, plunger 34 is forced downwardly by spring 35. However, when coil 36 is energized, the force of spring 35 tending to push the plunger downwardly is overcome by the force developed by the solenoid so that the plunger is in the raised position as shown in FIGS. 2 and 4.

Valve spool 39 is disposed within central bore 11. The spool is substantially cylindrical with a series of shoulders formed thereon which serve as valve seats with the shoulders on the body 10 surrounding internal bore 11, as will be explained below. The spool is also formed with a central longitudinal bore designated by the numeral 40 which will be referred to herein as the spool bore, and also cross bores 41 and 42 are provided extending from the spool bore 40 to communicate with the main central bore 11. Small central spool bore 43 is formed at the top of the spool to allow communication of the spool bore 40 at that point with the upper portion of the central bore 11. Plug 44 which is externally threaded is screwed into the lower end of this spool to plug the lower end of passage 40 and prevent communication of the spool bore at its lower end with the lower end of central bore 11. Resilient seal 45 is provided to prevent leakage from the lower end of spool bore 40.

Retainer 46 forms with body 10 a passage for communication from the central portion of bore 11 to exhaust passage 13 when the spool is in the position shown in FIG. 1, and also provides grooves for retention of resilient seals 47 and 48. Retainer 49 forms with body 10 a passage for communication from the central portion of bore 11 to exhaust passage 14 when the spool is in the position shown in FIG. 2, and also provides grooves for retention of resilient seals 50 and 51. Additional resilient seals are provided and perform functions to prevent flow of fluid. These additional seals are indicated in the drawings by the numerals 52, 53, 54, 55 and 56. Seals 52 and 53 are provided on either side of cross bore 41, and seals 54 and 55 are provided on either side of cross bore 42. Each of these resilient seals forms with a shoulder on body 10 or valve spool 39 a pair of valve seats which upon actuation solenoid 36 separate or come together to give the valve action desired. The position and structure of these valve seats will be considered below.

Additional valve seats are formed by the upper and lower face of plunger 34 which are designated by the numerals 57 and 58, respectively. These valve seats are formed to cooperate with valve seats formed in the lower surface of stop 27 which is designated in the drawings by the numeral 57a, and the upper face of spool 39 which is designated in the drawings by the numeral 58a. The valve seats 57 and 58 are formed by rubber inserts in the ends of the plunger.

In order to facilitate an understanding of the operation of the device shown herein consideration must be given to the valve seats. Valve seats 57 and 57a, as mentioned above, are formed by a rubber insert in the upper end of plunger 34 and the lower end of stop 57a, so that when the plunger is held upwardly in the energized state of the coil these seats join to prevent flow of fluid from the upper portion of central bore 11 out of the exhaust 31; whereas when the coil is de-energized and plunger 34 is pressed downwardly by coil 35, seats 57 and 57a separate to enable passage 31 to communicate with the upper portion of the main central bore 11. Likewise, the valve seat 58 formed by the rubber insert in the lower end of plunger 34 is designed to cooperate with valve seat 58a in the upper end of spool 39 to prevent flow of fluid between spool bore 40 and the upper end of central bore 11 through passage 43 when valve seats 58 and 58a are joined. Thus, when the coil is energized as shown in FIG. 2, valve seats 58 and 58a are separated and these faces are in contact when the coil 36 is de-energized as shown in FIGS. 1 and 3.

Resilient member 52 forms with a bevelled edge on the upper portion of valve spool 39 an additional valve seat closure. The bevelled edge is designated in the drawings by the numeral 52a. Resilient member 53 forms with shoulder 53a on retainer 46 an additional valve seat combination. An additional valve seat combination is formed by resilient member 48 and the shoulder 48a upon valve spool 39. An additional valve seat combination is formed by resilient member 54 and shoulder 54a which is formed on valve spool 39. Resilient member 55 forms with shoulder 55a of body 11 an additional valve seating combination. Likewise, resilient member 50 forms with the shoulder designated 50a in the lower end of valve spool 39 an additional valve seat combination. The remaining valve seat combination is composed of resilient member 56 and surface 56a of retainer 49.

It should be noted that each of the resilient members associated with the valve spool or mounted adjacent the valve spool lie within a peripheral slot formed in the retainer, the outside surface of the valve spool or the surface of valve body 10 formed to receive the resilient member, and hold it in position so that the various resilient members do not slide unless movement is forced upon them by movement of the valve spool. Also it should be noted that, as shown in the drawings, each of the resilient members referred to is in the form of a rubberized O-ring. These resilient members however can be any resilient seal suitably used for this purpose, and if rubber is used, the specific composition of the rubber must be such as to prevent attack upon it or corrosion to contacts with the medium used.

To summarize then, there are nine valve seat combinations. Seats 57 and 57a, 58 and 58a, 52 and 52a, 53 and 53a, 48 and 48a, 54 and 54a, 55 and 55a, 50 and 50a, and 56 and 56a.

Seats 52 and 52a, 53 and 53a, and 56 and 56a are always closed no matter what the condition of the solenoid. Valve seats 57 and 57a, 48 and 48a, and 55 and 55a are in contact and closed when the solenoid coil is in its energized condition and the plunger 34 is raised, as shown in FIGS. 2 and 4; whereas these valve seats are separated and opened when the solenoid coil is in its de-energized condition and the plunger 34 is in its lowered position, as shown in FIGS. 1 and 3.

The remaining valve faces 58 and 58a, 54 and 54a, and 50 and 50a are joined and these valve seats closed when the solenoid coil is in its de-energized condition as shown in FIGS. 1 and 3; whereas these valve seats are opened and separated when the coil is energized.

In order to understand the operation of the valve in accordance with the description which follows, in addition to recognizing the relative positions of the valve seats when the solenoid is in the actuated or de-actuated state, note should be taken that when the coil is de-energized, plunger 34 is in a condition where it is being pressed away from stop member 27; whereas when the coil is energized, plunger 34 is disposed with its upper surface flush against stop 27. Likewise, when the coil is de-energized, valve seats 58 and 58a are in contact so that the valve spool 39 and plunger 34 are in contact, whereas when the coil is energized, these are separated.

Further it should be noted that when the coil is de-energized, the valve spool is raised, whereas when the coil is energized, it is lowered. Additionally, when the coil is energized the pressure flow is from the inlet 12 to cylinder port 18 and cylinder port 19 is open to exhaust through passage 14.

The upper portion of central bore 11 and the bore formed in solenoid end cap 22 form with sleeve 26 the pilot chamber which is designated in the drawings by the numeral 11a. The pilot chamber is pressurized when the solenoid coil is energized since there is communication between the pilot chamber and inlet 12 by means of bore 40 and bore 43 within the valve spool. When the solenoid coil is de-energized, the pressure flow is from inlet port 12 to cylinder port 18 and cylinder port 19 communicates with exhaust through bore 13. In this, the de-energized condition, pilot chamber 11a is open to exhaust through bore 31, and valve seats 58 and 58a are cooperating to prevent flow of pressure from within the valve spool into the pilot chamber.

The operation of the device will now be explained with reference to FIGS. 1 and 2. Considering FIG. 1 which shows the coil in the de-energized state, spring 35 is maintaining plunger 34 downwardly and the valve seats 57 and 57a are separated with chamber 11a being exhausted to atmosphere through pilot exhaust 31. Valve spool 39 is maintained upwardly by the forces developed on the surface designated in the drawings by upwardly directed arrows given the letter "X." These forces are developed by the fluid flowing from inlet 12 through bore 40. When this condition exists, the moving seals formed by valve seats 58 and 58a are joined as are 52, 52a, 53, 53a, 54, 54a, 50, 50a, and 56, 56a, with the only seals open being the mating elements 57, 57a, 48, 48a and 55, 55a.

Upon energization of coil 36 via leads 37, the downward forces of spring 35 are overcome by the solenoid force developed, and plunger 34 is drawn upwardly so that the seats formed by 57 and 57a join, and pilot chamber 11a is no longer in communication with pilot exhaust 31. This then opens the seal formed by surfaces 58, 58a and pressure fluid is allowed to flow from bore 40 into pilot chamber 11a shifting valve spool 39 to the offset position shown in FIG. 2 where the inlet 12 is opened to cylinder port 18 and cylinder port 19 is opened to exhaust. Vent 17 formed in lower cap 20 allows the valve spool to move downwardly, for if it were not present, the pressure in the lower end of the central bore would have to be overcome for the valve spool to move to this position shown in FIG. 2. The forces for shifting the valve spool to the position shown in FIG. 2 are derived from the fluid pressure developed at the surface wherein the vectors designated by the letter "Y" are shown. The force vectors "X" no longer control since the surface upon which they are operating is now one-half the effective surface upon which the vectors "Y" are operating. In the energized position in FIG. 2 the total effective force "X" is measured operating on the area, the diameter of which is less than the diameter of the surface upon which the forces "Y" operate. In other words, in the de-energized condition the forces attempting to move the plunger upwardly are operating on an area which is greater than the area upon which the downwardly directed forces are pressing. However, in the energized condition shown in FIG. 2, the force measured by the diameter attempting to move the plunger upwardly is operating on an area which is less than the area upon which the downwardly directed forces are operating. The particular areas upon which these forces operate is known as the differential area.

It is obvious, therefore, that the solenoid coil in this device acts as a control coil only, and it is not necessary to supply electrical power to actually move valve spool 40, since the force for moving the valve spool is actually the force developed by the fluid or medium flowing. It is necessary only that the coil be designed to have sufficient power to overcome the force of spring 35 and whatever gravitational force is developed by the weight of plunger 34, so that when the coil is energized, the plunger can be drawn upwardly towards stop member 30. Movement of the piston is effected by the fluid flowing. Also, since surfaces 58 and 58a move immediately toward one another when the coil is de-energized, and immediately away from one another when the coil is energized, the reaction time is shortened. Also due to this construction, there is space conservation since the electrical portions of the valve do not have to be designed for high power consumption. The inertia to be overcome to change the state of the valve is primarily that of the medium involved and not the inertia of the elements of the valve proper.

Another extremely important advantage is that since the travel time and distance of travel of the plunger 34 is short, kinetic energy of the plunger is low, so that when the plunger strikes stop 27, the impact force is low. A common type failure in valves generally is the failure resulting from continual impact of elements of the valve against stops.

In FIGS. 3 and 4 a valve is shown which is identical with the valve shown in FIGS. 1 and 2 except for the structure of the valve spool and the solenoid end cap. Parts identical with those in FIGS. 1 and 2, where individually identified, are given the same number as in 1 or 2. The essential difference between the valve shown in FIGS. 3 and 4 and that shown in FIGS. 1 and 2 is that the valve shown in FIGS. 3 and 4 contains a separate pilot supply inlet which is designated in the drawings by the numeral 59, and the valve spool which is designated 60 contains a central longitudinal bore which is designated by the numeral 61 and which does not communicate directly with central bore 11 through passage 43 and does not contain a plug at its lower end. Rather the small central bore 43 in the valve shown in FIGS. 3 and 4 is in communication only with cross bore 41 which—in turn—is designed to communicate with the pilot pressure supply inlet 59.

The valve shown in FIGS. 3 and 4 contains all of the seals which were present in the valve shown in FIGS. 1 and 2 and these seals function exactly in the manner in which they function in the valves shown therein.

The operation of the valves shown in FIGS. 3 and 4 is essentially identical to the operation of the valves shown in FIGS. 1 and 2. However, since the pilot chamber communicates only with the pilot pressure supply through inlet 59, the pilot pressure line can be separated completely from the inlet pressure line and uses for such a device well known in the art.

In the device shown in FIGS. 3 and 4 energization of coil 36 raises plunger 34; whereas in the de-energized state shown in FIG. 3, plunger 34 is away from stop 30 and the pilot chamber is exhausted to atmosphere through pilot exhaust 31. In the de-energized condition the cross bore 41 is communicating with the pilot pressure supply 59 and constant pressure is applied through channel 59 behind the pilot ring 52 so that force vectors "W" can maintain the valve spool 60 in an upward position seating valve seats 58 and 58a. The remaining inlets and outlets and seals operate and function in exactly the manner shown in FIG. 1 wherein the first embodiment is shown in the de-energized condition.

When the coil 36 is energized however, plunger 34 is raised enabling the pressure fluid in cross bore 41 to communicate with the pilot chamber by means of bore 43 so that forces "Z" are developed on the top of the valve spool and it is driven downwardly to the energized position shown in FIG. 4. In the position shown in FIG. 4 the various inlets and outlets with the exception of port 59, and the various valve seats are functioning in exactly the same manner as in FIG. 2 wherein is shown the first embodiment of the invention in the energized or activated condition. The pressure build up in the pilot chamber when the solenoid is activated occurs because the valve seats 57 and 57a are joined in both the FIG. 2 and the FIG. 4 embodiments.

Figure 5:
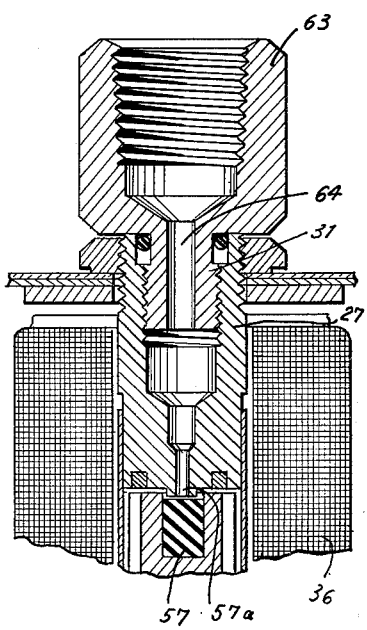
FIG. 5 is a cross sectional view of a hydraulic adapter which is used when a liquid pilot medium is utilized.

In each of the embodiments shown in FIGS. 1 through 4, an upper end cap is shown and is designated generally in the drawings by the numeral 62. This cap, however, is contemplated for use solely when the medium is in the gaseous condition or state, so that the pilot chamber can be exhausted to atmosphere. When, however, a liquid is used either as the medium in the device shown in FIGS. 1 or 2, or as the pilot medium as in the device shown in FIGS. 3 and 4, an attachment must be used to allow the liquid to be conducted into the main sump tank. In FIG. 5 such an attachment is shown and designated by the numeral 63. This attachment is fastened to the top of the solenoid housing in a conventional manner and bore 64 is provided which functions in the manner of bore 31 in the other drawings herein. The use of such an attachment replacing member 62 in the other drawings conveniently allows the liquid to be conveyed to a desired location.

Thus, among others, the several objects of the invention as specifically aforementioned, are achieved. Obviously, numerous changes in construction and re-arrangement of parts might be resorted to without departing from the spirit of the invention as defined by the claims.

I claim:

1. A valve structure for conducting a medium comprising a body, a cavity formed within said body, a second cavity formed in said body as a continuation of said first cavity, a spool disposed within said first cavity and movable therein toward and away from said second cavity, sealing means mounted upon said spool sealing said first and second cavities from each other, an inlet port formed in said body communicating with said first cavity, an outlet port formed in said body communicating with said first cavity, exhaust means enabling said first cavity to be exhausted by communication therewith, second exhaust means enabling said second cavity to be exhausted by communication therewith, a central bore formed in said spool, internal port means communicating said central bore with said first cavity, second internal port means communicating said central bore with said second cavity, a plunger disposed within said second cavity and movable therein for alternately blocking said second exhaust and said second internal port means, means for moving said plunger within said second cavity, and cooperating seals formed on said spool and the walls of said first cavity whereby upon movement of said plunger to block said second exhaust means the medium is conducted into said second cavity through said first and second internal port means and said central bore and said spool is moved to allow the medium to be conducted simultaneously through said inlet port to said outlet port.

2. A valve structure for conducting a medium in accordance with claim 1, in which the second exhaust means consists of an exhaust port in communication with the second cavity and the plunger has attached thereto a valve seat which upon movement of the plunger contacts and blocks the exhaust port, and the means for moving the plunger within the cavity is a solenoid coil.

3. A valve structure for conducting a medium in accordance with claim 2, in which the plunger is a cylindrical member formed of a magnetic material which is the core of the solenoid coil.

4. A valve structure for conducting a medium in accordance with claim 2, in which the first and second cavities are substantially cylindrical and the plunger and spool are substantially cylindrical having the same central axis.

5. A valve structure for conducting a medium comprising a body, a cavity formed within said body, a second cavity formed in said body as a continuation of said first cavity, a spool disposed within said first cavity and movable therein toward and away from said second cavity, sealing means mounted upon said spool sealing said first and second cavities from each other, an inlet port formed in said body communicating with said first cavity, an outlet port formed in said body communicating with said first cavity, exhaust means enabling said first cavity to be exhausted by communication therewith, second exhaust means enabling said second cavity to be exhausted by communication therewith, a central bore formed in said spool, internal port means communicating said central bore with said first cavity, second internal port means communicating said central bore with said second cavity, a plunger disposed within said second cavity and movable therein for alternately blocking said second exhaust and said second internal port means, means for moving said plunger within said second cavity, cooperating seals formed on said spool and the walls of said cavity whereby upon movement of said plunger to block said second internal port means said second cavity is exhausted through said exhaust means allowing said spool to move so that the medium is conducted through said inlet port to said outlet port.

6. A valve structure for conducting a medium in accordance with claim 5, in which the second exhaust means consists of an exhaust port in communication with the second cavity and the plunger has attached thereto a valve seat which upon movement of the plunger contacts and blocks the exhaust port, and the means for moving the plunger within the cavity is a solenoid coil.

7. A valve structure for conducting a medium in accordance with claim 6, in which the plunger is a cylindrical member formed of a magnetic material which is the core of the solenoid coil.

8. A valve structure for conducting a medium in accordance with claim 6, in which the first and second cavities are substantially cylindrical and the plunger and spool are substantially cylindrical having the same central axis.

9. In a valve structure for conducting a medium a body, a cavity formed within said body, a second cavity formed in said body as a continuation of said first cavity, a spool disposed within said first cavity and shiftable therein toward and away from said second cavity, a surface of said spool, sealing means between said first and second cavities, said surface being between said sealing means and said second cavity, an inlet port formed in said body communicating with said first cavity, an outlet port formed in said body communicating with said first cavity, a control medium, means for filling said second cavity with said control medium and applying fluid pressure to said surface to shift said spool, and cooperating seals formed by said spool and said body which are separated by shifting of said spool whereby said inlet and outlet ports are in medium conducting communication.

10. A valve structure for conducting a medium in accordance with claim 9, in which the means for filling the second cavity consists of a central bore formed in the spool, a control medium source, internal port means communicating said central bore with said control medium source, and second internal port means communicating said central bore with said second cavity.

11. A valve structure for conducting a medium in accordance with claim 9, in which the means for filling the second cavity consists of a central bore formed in the spool, internal port means communicating the central bore with said first cavity and second internal port means communicating said central bore with said second cavity.

12. A valve structure for conducting a medium in accordance with claim 9, in which the means for filling the second cavity consists of a central bore formed in the spool, a control medium port in communication with said central bore and second internal port means communicating said central bore with said second cavity.

13. A valve structure for conducting a medium in accordance with claim 10, in which means are provided for blocking the second internal port means and exhausting the second cavity.

14. A valve structure for conducting a medium in accordance with claim 13, in which the means for blocking the second internal port and exhausting the second cavity to atmosphere consists of a plunger, an exhaust port formed in the body communicating with the second cavity, and means for shifting the plunger so that it alternately blocks the second internal port and the exhaust port.

15. A valve structure for conducting a medium in accordance with claim 14, in which the plunger is a cylindrical member formed of a magnetic material and the means for shifting the plunger is a solenoid coil the core of which is formed by said plunger.

16. A valve structure for conducting a medium in accordance with claim 15, in which the first and second cavities are substantially cylindrical and the plunger and spool are substantially cylindrical having the same central axis.

17. In a valve structure for conducting a medium a body, a cavity formed within said body, a second cavity formed in said body as a continuation of said first cavity, a spool disposed within said first cavity and shiftable therein toward and away from said second cavity, sealing means between said first and second cavities, a surface of said spool disposed between said sealing means and said second cavity, a second surface of said spool disposed between said sealing means and said first cavity, an inlet port formed in said body communicating with said first cavity, an outlet port formed in said body communicating with said first cavity, a control medium, means for applying said control medium to said first surface, means for applying said control medium to said second surface whereby said spool is shifted in accordance with the differential pressure forces on said surfaces, and cooperating seals formed by said spool and said body which are separated by shifting of said spool whereby said inlet and outlet ports are in medium conducting communication.

18. A valve structure for conducting a medium in accordance with claim 17, in which the means for applying the control medium to the first surface consists of a central bore formed in the spool, internal port means communicating the second cavity with said central bore, second internal port means communicating with said control medium whereby said control medium can enter the second cavity and apply pressure forces to said surface.

19. A valve structure for conducting a medium in accordance with claim 17, in which the means for applying the control medium to the second surface consists of a central bore formed in the spool adjacent said second surface and an internal port communicating said central bore with the control medium.

20. A valve structure for conducting a medium in accordance with claim 17, in which the first and second cavities are substantially cylindrical having the same central axis and the first and second surfaces are substantially circular and are spaced from each other in opposed relation on the same central axis.

21. In a valve structure for conducting a medium a body, a substantially longitudinal cavity formed within said body, a second substantially longitudinal cavity formed in said body as a continuation of said first cavity and having the same central axis, a spool disposed within said first cavity and shiftable therein toward and away from said second cavity, a surface of said spool forming a wall of said second cavity, sealing means between said first and second cavities mounted on said spool, an inlet port formed in said body communicating with said first cavity, a central bore formed in said spool, an internal port communicating said central bore with said first cavity, a second internal port communicating said central bore with said second cavity, means for blocking said second internal port, means for exhausting said second cavity, an outlet port communicating with said first cavity, a second outlet port communicating with said first cavity, cooperating seals formed by said spool and said body which are separated by shifting of said spool whereby said inlet and first outlet port are in medium conducting communication, and second cooperating seals formed by said spool and said body which are joined by shifting of said spool whereby said inlet and said second outlet port are obstructed from medium conducting communication.

22. A valve structure for conducting a medium in accordance with claim 21, in which the means for blocking the second internal port and exhausting the second cavity to atmosphere consists of a plunger, an exhaust port formed in the body communicating with the second cavity and means for shifting the plunger so that it alternately blocks the second internal port and the exhaust port.

23. A valve structure for conducting a medium in accordance with claim 22, in which the plunger is a cylindrical member formed of a magnetic material and the means for shifting the plunger is a solenoid coil the core of which is formed by said plunger.

References Cited in the file of this patent

UNITED STATES PATENTS

| 2,624,585 | Churchhill | Jan. 6, 1953 |
| 2,898,936 | Collins | Aug. 11, 1959 |
| 2,910,089 | Yarber | Oct. 27, 1959 |
| 2,913,005 | Grant | Nov. 17, 1959 |
| 2,916,051 | Taylor | Dec. 8, 1959 |
| 2,924,242 | White | Feb. 9, 1960 |